United States Patent [19]
Jourdan

[11] 3,771,300
[45] Nov. 13, 1973

[54] HARVESTING APPARATUS
[75] Inventor: Michel L. M. Jourdan, Coulimer, France
[73] Assignee: Societe Anonyme dite: Gustin Fils, Deville, France
[22] Filed: Aug. 25, 1972
[21] Appl. No.: 283,807

Related U.S. Application Data
[63] Continuation-in-part of Ser. No. 175,837, Aug. 30, 1971, abandoned.

[30] Foreign Application Priority Data
Sept. 4, 1970 France .............................. 7032192
Mar. 1, 1971 France .............................. 7106931

[52] U.S. Cl. ..................... 56/119, 56/13.9, 56/60, 56/95
[51] Int. Cl. ........................................... A01d 45/02
[58] Field of Search ................. 56/13.9, 14.3, 14.5, 56/60, 61, 95, 119, 503

[56] References Cited
UNITED STATES PATENTS
1,121,998  12/1914  Gray .................................. 56/13.9
2,188,522  1/1940  Alfs ................................. 56/13.9 X
2,477,794  8/1949  Gehl .................................. 56/13.9
3,088,261  5/1963  Lagouarde ........................... 56/13.9

Primary Examiner—Louis G. Mancene
Assistant Examiner—J. A. Oliff
Attorney—Ernest A. Greenside

[57] ABSTRACT

The present invention relates to apparatus for use with a tractor for lifting or harvesting and chopping vegetables e.g., maize, and delivering them to a trailer or other vehicle accompanying the tractor, the apparatus comprising a harvesting member having a pair of forwardly diverging plates adapted to receive the vegetables to be harvested and connected at their rear portions to a chopping and loading passage positioned transversely to the direction of advance of the tractor, said harvesting member being provided with a rotary cutting plate and with a cylindrical member integral therewith cooperable with a pressing or compacting member movable in the plane of said cutting plate towards and away from said cylindrical member so as to compact the vegetables thrust therebetween and orient said vegetables as desired within said plates for movement into said chopping and loading passage.

7 Claims, 4 Drawing Figures

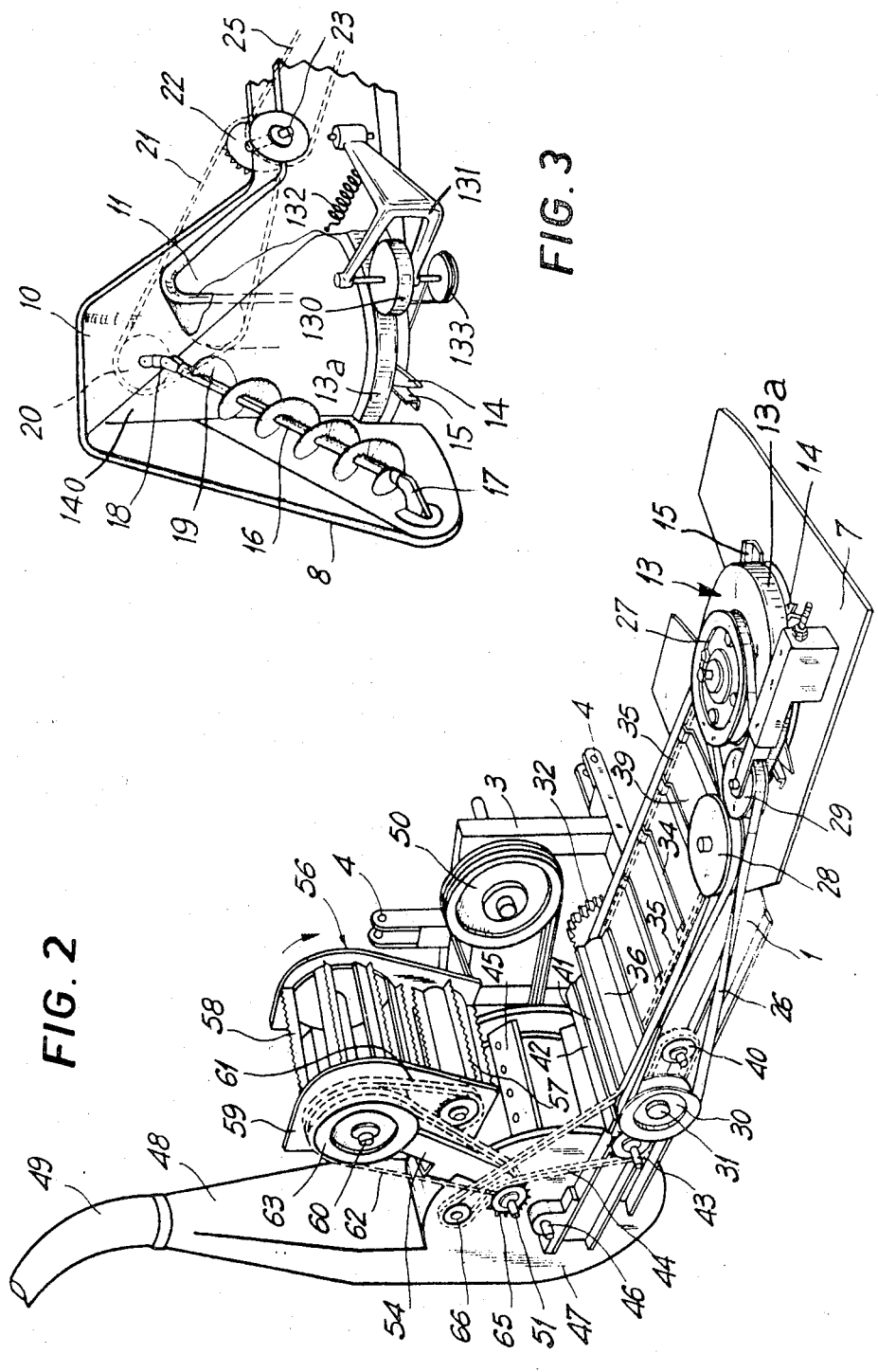

HARVESTING APPARATUS

The present application is a continuation-in-part of the applicant's application Ser. No. 175,837 filed Aug. 30, 1971, now abandoned.

This invention relates to apparatus for use with a tractor for lifting or harvesting and chopping vegetables, for example maize, and delivering the harvested and chopped product to a tralier or other vehicle accompanying the tractor.

Apparatus of this kind are known which are designed to be carried or dragged by a tractor. They are generally disposed laterally with respect to the tractor on the side remote from that on which the trailer is situated. Such apparatus consists essentially of a lifting or harvesting member which is provided with conveyor means which chops and feeds the harvested vegetables to a drum equipped with blades. The drum again chops the harvested products and delivers them to a chute, passage, duct or the like which directs them to the trailer.

This lateral and overhanging arrangement of the apparatus leads to difficulties in balancing the machinery and in the drive for the moving parts, in which it is necessary to use bevel gears and a complex mechanism.

According to the present invention there is provided apparatus for harvesting vegetables for use in combination with a tractor, comprising a harvesting member having a pair of forwardly diverging plates adapted to receive the vegetables to be harvested, said plates being connected at their rearward extremities to walls defining a chopping and loading passage disposed transversely to the direction of advance of the tractor, said harvesting member including in the lower portion thereof circular cutter plate, the upper face of said cutter plate being provided with a cylindrical member integral therewith and adapted for rotation with said cutter plate, a compacting member being disposed in the plane of said cylindrical member and adapted for movement in said plane towards and away from said cylindrical member so as to compact the vegetables thrust therebetween and thereby orient said vegetables as desired within said diverging plates for movement into said chopping and loading passage.

The invention will now be described, by way of example, with reference to the accompanying drawings, in which:

FIG. 2 is a perspective view of the apparatus of FIG. 1, but with the top guide for the lifted or harvested products removed to show the mechanism more clearly;

FIG. 3 is a partial front view of the lifting or harvesting member; and

Figure 1:
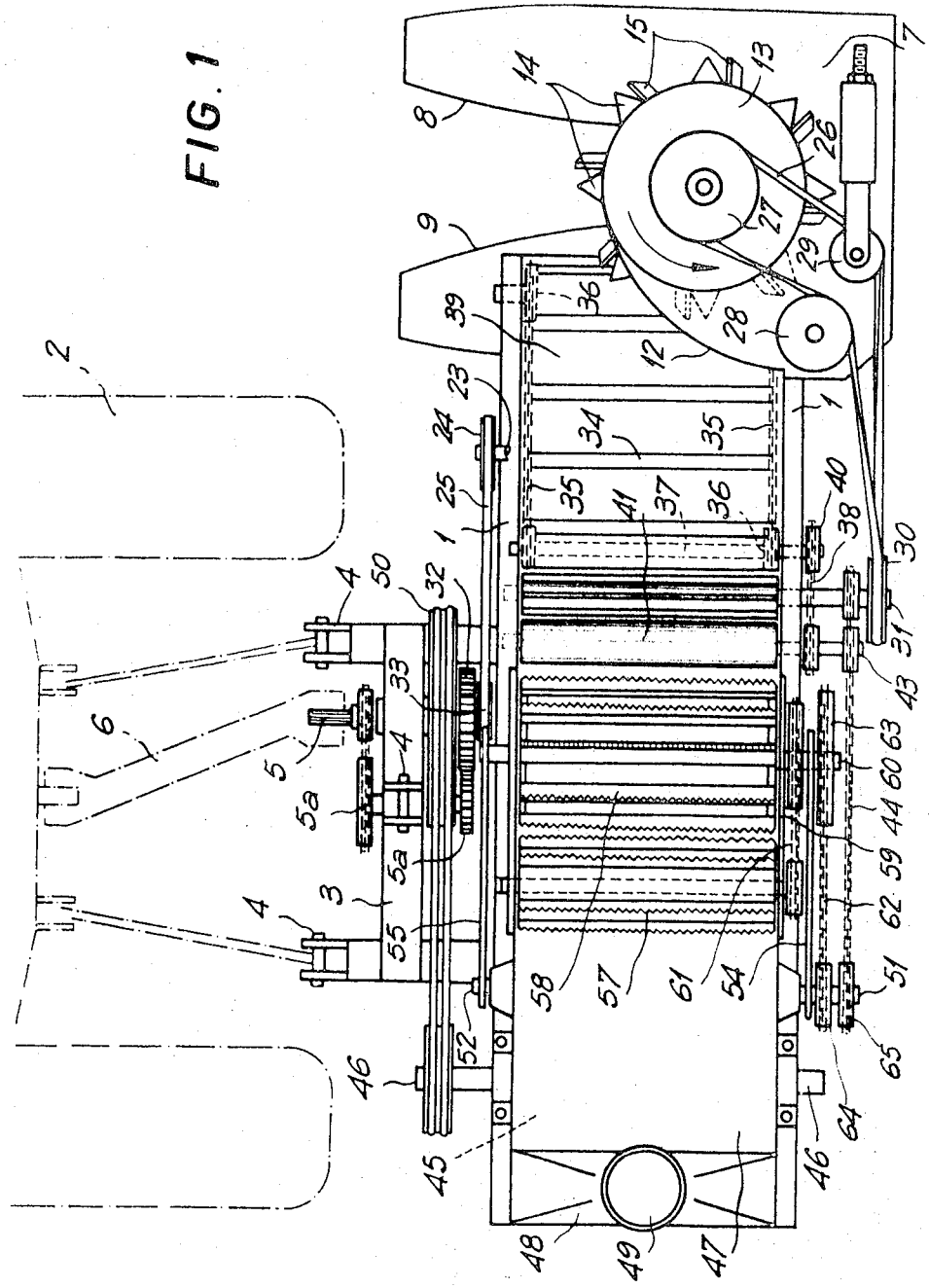
FIG. 1 is a diagrammatic plan view of a first embodiment of the apparatus according to the present invention, the top part of the lifting or harvesting member having been removed.

In the embodiment shown in FIGS. 1 to 3, the apparatus or silo-filler comprises a frame 1 intended to be disposed transversely substantially in a horizontal plane at the rear of a tractor 2 (FIG. 1). To this end, the frame comprises a gantry 3 having three conventional hitching points 4.

The various moving parts of the machine are driven by a shaft 5 parallel to the direction of advance and adapted to be coupled to a universal-joint power take-off shaft 6 of the tractor. The shaft 5 is connected to various elements of a reduction gear 5a.

The product to be stored in a silo is lifted by a member 7 which comprises two side plates 8 and 9 which diverge in the forward direction. The plates extend to the vicinity of the ground. In profile they are each substantially in the form of a right-angled triangle, the hypotenuse of which is oblique and the sides including the right-angle being substantially horizontal and vertical respectively, an acute angle being directed forwardly. They are connected to transverse vertical walls 10 and 11 which are parallel to one another and by which they are respectively fixed to the front and rear longitudinal members of the frame 1.

A substantially conical deflector 140 is disposed within the space defined by the angle of the harvesting member formed by the inner face of the plate 8 and the rear transverse wall 10. This deflector 140 constitutes a casing for protecting the drive mechanism of a vertical-axis cutter wheel 13 and prevents the cramming of the cut stems in this angle of the harvesting member. It therefore improves the orientation of the cut stems, which from the vertical position pass to the horizontal position. The wheel 13 is provided with blades 14 for cutting of the product which is to be lifted or harvested. Lugs 15 are provided for conveying the lifted or harvested product into a chute formed by the walls 10 and 11. The wheel 13 is provided at its upper face with a cylindrical member 13a which is integral therewith and rotatable with the wheel.

In the same plane as cylindrical member 13a (FIG. 3), and extending through plate 9 of the harvesting member, is a cylindrical roller 130 mounted on an arm 131 which is articulated either to the frame 1 of the machine or on vertical wall 11. The arm is subjected to the influence of an elastic or spring-like member 132 which tends to maintain roller 130 in contact with the cylindrical member 13a. The cylindrical roller 130 is rotated in sychronism with cutter wheel 13 but in the opposite direction by virtue of a suitable transmission 133 which connects it, for example, to the shaft of the wheel 13. According to a modified form the cylindrical roller 130 may be so constructed and mounted as to rotate freely.

A screw conveyor 16 is mounted obliquely in profiled bearings 17 on the plate 8 and extends to a position above the deflector 140. A universal-joint shaft 19 connects the conveyor 16 to the rear of the wall 10 to a drive gear or pulley 20 which is connected via a chain or belt 21 to a pulley or gear 22 mounted on a shaft 23 that is parallel to shaft 5 to which it is connected via a suitable transmission comprising a gear or pulley 24 and a belt or chain 25 (FIG. 3).

The purpose of the screw conveyor 16 is to elevate the top part of the cut vegetables so that the latter are engaged in the chute by their bottom part which is conveyed by the lugs 15 of the cutter wheel 13.

The shaft 23 also assists in the orientation of cut stalks longitudinally in the chute.

The cutter wheel 13 is driven in the direction of the arrow shown in FIG. 1 by a belt 26 passing around a pulley 27, coaxial with the wheel, reversing and tensioning pulleys 28, 29, and a drive pulley 30 fixed on a shaft 31 parallel to shaft 5. Shaft 31 is driven by a gear 32 which is connected to the reduction gear 5a via a transmission 33.

Adjacent the bottom of the horizontal chute laterally bounded by the walls 10 and 11 is a conveyor 34 consisting, for example, of parallel rollers all driven in the same direction or, as shown in FIGS. 1 and 2, scrapers attached at their ends to chains 35 which pass over gear wheels 36 which are situated towards the center of the machine, are fixed on a shaft 37 parallel to shaft 31 and are driven by the shaft 31 via a transmission 38. The scrapers move above a plate 39 provided at the bottom of the chute.

The conveyor 34 is followed by a ribbed roller 40 fixed on shaft 31, and then by a plain roller 41 to which a back blade 42 is connected tangentially thereof. Roller 41 is mounted on a shaft 43 and is driven at the same speed and in the same direction as the roller 40 by means of a chain transmission 44 (FIG. 2).

A chopper drum 45, having transverse blades cooperates with the back blade 42, is mounted on a shaft 46, which is also parallel to shaft 5, in a cylindrical casing 47 of a tangential and vertical conduit 48 connected to a curved outlet duct 49. Shaft 46 is driven at high speed (1,200 r.p.m. for example) via a pulley and belt transmission 50 by which it is connected to shaft 5.

Braced side arms 54 and 55 are freely pivotable on trunnions 51 and 52 mounted outside the casing 47 near the opening of the casing adjacent the back blade 42. A presser 56 is mounted between the arms 54, 55. The presser comprises two rollers 57 and 58 of different sizes which are ribbed and accommodated in a frame 59 adapted to rock about the shaft 60 of the larger roller 58 farther away from the trunnions 51, 52. A step-up transmission 61 connects its shaft to the shaft of the smaller roller 57.

The two-roller assembly is driven in the direction of the arrow (FIG. 2) via a chain 62 passing over gear wheels 63, 43 respectively fixed on shaft 60 and trunnion 51.

Trunnion 51 also bears a gear wheel 65 meshing with chain 44 used to drive rollers 40 and 41, the chain passing over a reversing gear wheel 66 for this purpose and mounted on the casing 47.

The above described drive system results in synchronization of the movements of the bottom rollers 40, 41 and the top rollers 57, 58.

Figure 4:
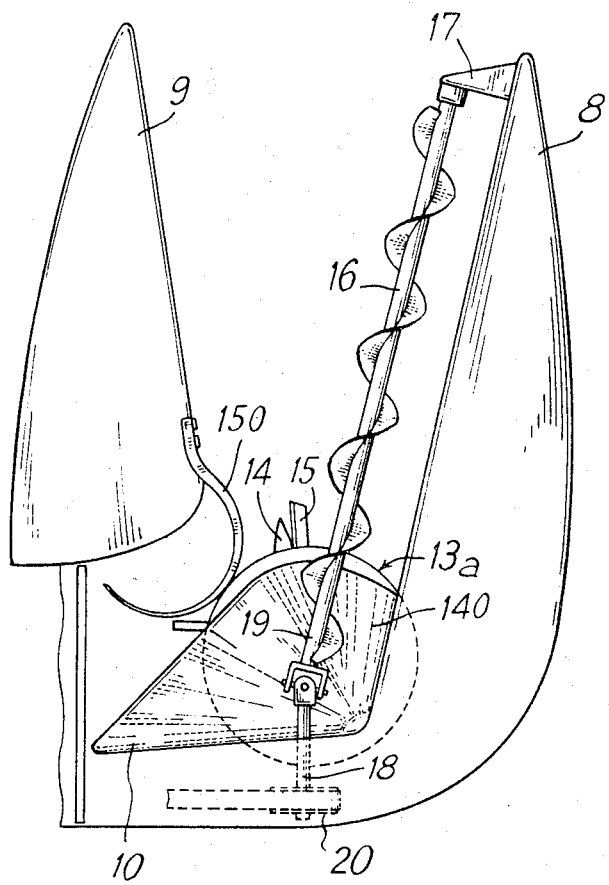
FIG. 4 is a partial plan view showing modification of the harvesting in accordance with this invention.

In the embodiment shown in FIG. 4, the harvesting member, which remains equipped with the various accessories described hereinbefore, comprises in place of the cylindrical roller 130 of FIG. 3, a bent spring blade 150 located in the same plane as the cylinder 13 and fixed to the plate 9 of the harvesting member and, which may be in contact with the cylinder 13a. This spring blade is adapted to retract eleastically under the pressure of the harvested crop whilst simultaneously pushing the latter towards the cutter wheel 13.

The above described silo-filler operates as follows.

As the tractor moves forward the cutter wheel 13 reaps the vegetables. The fingers or lugs 15 fold the lower ends of the stem towards the conveyor 34. During this passage the stems are advantageously squeezed against the cylinder 13a either by the cylindrical roller 130 or by the blade 150. This substantially improves the change of direction that the base of each stem must undergo. The screw conveyor 16 lifts the upper ends of the stems and moves them towards the wall 10. They are thus guided onto the conical surface 140, and the closer they approach the wall the more they incline and engage horizontally on the conveyor 34.

The association of the roller 130 or blade 150 of a single screw conveyor 16 and of the conical deflector 140 permits a correct guiding of the cut stems, even at high outputs, with a minimum of accessories mounted on the harvesting member.

The stalks are fed in an orientation parallel to the walls of the chute via the conveyor 34 between the two pairs of rollers 40, 41 and 57, 58. The rollers 57, 58 compress the layer of stalks while lifting or dropping in varying degrees, by gravity, depending upon the thickness of the layer. This affords excellent chopping of the vegetables.

In its casing the chopping drum 45 acts as a centrifugal fan to deliver the chopped products to the conduit 48 and the duct 49.

The invention can be applied to the ensilage of all kinds of vegetable products. It is particularly but not exclusively suitable for the ensilage of maize. The machine may be carried as in the above-described example, semi-carried, or dragged.

The invention is not limited to the above-described embodiments, but covers all variants thereof which can be made without departing from the scope thereof as defined by the appendant claims.

What is claimed is:

1. Apparatus for harvesting vegetables for use in combination with a tractor, comprising a harvesting member having a pair of forwardly diverging plates for receiving the vegetables to be harvested, said plates being connected at their rearward extremities to walls defining a chopping and loading passage disposed transversely to the direction of advance of the tractor, said harvesting member including in the lower portion thereof a circular cutter plate, rotatable about a substantially vertical axis, the upper face of said cutter plate being provided with a cylindrical member integral therewith and rotatable with said cutter plate, a compacting member being disposed in the plane of said cylindrical member and movable in said plane towards and away from said cylindrical member for compacting the vegetables thrust therebetween and thereby orienting said vegetables as desired within said diverging plates for movement into said chopping and loading passage.

2. Apparatus according to claim 1, wherein said compacting member is a bent elastic blade secured to said harvesting member and urged towards engagement with said cylindrical member.

3. Apparatus according to claim 1, wherein said compacting member is a cylindrical roller mounted to rotate on an axis integral with an elastic member, said elastic member maintaining said roller in engagement with said cylindrical member.

4. Apparatus according to claim 3, wherein said cylindrical roller is free to rotate.

5. Apparatus according to claim 3, wherein the rotation of said cylindrical roller is controlled by means connecting the shaft of said cutter plate to the axis of said roller.

6. Apparatus according to claim 1, wherein said harvesting member is provided with a substantially conical deflector which extends above said cutter plate, the apex of said deflector being directed upwardly so as to close the inner angle formed by one of said diverging plates of the harvesting member and the transverse wall adjacent thereto.

7. Apparatus for harvesting vegetables for use in combination with a tractor comprising a harvesting member having a pair of forwardly diverging plates for receiving vegetables to be harvested, said plates being connected at their extremities to transverse walls defining a chopping and loading passage disposed transversely to the direction of advance of the tractor, one of said plates with an adjacent one of said transverse walls defining an inner angle, said harvesting member including in the lower portion thereof a circular plate rotatable about a substantially vertical axis and being provided with a substantially conical deflector which extends above said cutter plate, the apex of said deflector being directed upwardly and lying in said inner angle to orient said vegetables as desired within said diverging plates for movement into said chopping and loading passage.

* * * * *